United States Patent Office 3,459,502
Patented Aug. 5, 1969

3,459,502
PRODUCTION OF ALUMINA FROM DAWSONITE
Robert A. Van Nordstrand, Tulsa, Okla., assignor to Sinclair Research, Inc., New York, N.Y., a corporation of Delaware
No Drawing. Filed Mar. 10, 1967, Ser. No. 622,091
Int. Cl. C01f 7/38
U.S. Cl. 23—143      7 Claims

ABSTRACT OF THE DISCLOSURE

A process for the production of alumina from sodium aluminum carbonate hydroxide such as dawsonite comprising heating the sodium aluminum carbonate hydroxide from about 500 or 700° F. to 1100° F. to produce a partial decomposition thereof, leaching the resulting product with water to remove sodium leaving a relatively pure aluminum hydroxide, and subsequently calcining this aluminum hydroxide, e.g. at 2100° F. to produce alumina.

---

This invention is directed to a process for the production of alumina from dawsonite, a microcrystalline, white sodium aluminum carbonate hydroxide of composition $NaAl(CO_3)(OH)_2$, which is cited in current mineralogy texts as a rare mineral. Recently, however, a deposit of unknown size of pure, i.e. 80 to 100 wt. percent, dawsonite has been found in Olduvai Gorge, Tanzania. Also, there is a 500-foot section of oil shale extending over a 400 square mile area in the so-called Green River shale formation located in the state of Colorado, which contains about 15 percent dawsonite, along with kerogens, nahcolite, dolomite, quartz, and albite. A process for removing the dawsonite components from retorted oil shale and reconstituting them into relatively pure dawsonite is described in my copending application Ser. No. 622,056, filed Mar. 10, 1967, and now Patent 3,389,975, which also describes a method for making synthetic sodium aluminum carbonate hydroxide which can be called dawsonite.

Dawsonite has thus become available in large quantities and it is of interest to develop a process for obtaining the aluminum from dawsonite, preferably as alumina which is the starting point of aluminum metal manufacture. The interest in such a process is of particular interest in the United States since there are few commercially workable deposits of bauxite, the mineral from which alumina has heretofore almost exclusively been produced. The workable deposits of bauxite in the United States fill at most 20 to 25% of the present U.S. requirements of alumina.

Additionally, heretofore, alumina has been produced from bauxite primarily by the Bayer Process, the economic feasibility of which is dependent upon a source of ore having a relatively high aluminum content. The Bayer Process also has several disadvantages aside from requiring an ore of high aluminum content. For example, depending upon the source of the bauxite, heavy concentrations of caustic soda and high temperatures, e.g. 120 to 140° C. or even 200 to 250° C., can be required in the Bayer Process since it relies upon the solubility equilibria of alumina hydrates in caustic soda solution to attack the bauxite and produce alumina. Separation and washing of the insoluble residues remaining from the caustic attack, commonly known as red muds, to obtain a clean aluminate liquor is also difficult due to the very fine size of the particles, sometimes less than 1 micron. Furthermore, it can take 24 hours, or more, to obtain a satisfactory precipitation or settling of aluminum trihydrate from the aluminate liquor before it can be separated for calcination to alumina.

The present invention provides a simple process for the production of alumina from sodium aluminum carbonate hydroxide. It would appear that a method for obtaining alumina from dawsonite would be to dissolve it either in an acid or in a base, such as, respectively, hydrochloric acid or sodium hydroxide, and then neutralize the solution which would cause aluminum hydroxide to precipitate which could then be washed and calcined at 2100° F. to produce alumina. Both of these methods are, however, rather expensive with regard to the chemicals used and have many of the disadvantages of the Bayer Process. Both methods, for example, produce a gelatinous aluminum hydroxide which is difficult to separate and wash.

In accordance with this invention, it has been found, however, that although a sodium aluminum carbonate hydroxide such as dawsonite may be expected to transform to sodium aluminate ($NaAlO_2$) on calcination there is an intermediate stage during the calcination at temperatures in the range of about 500° to 1100° F. when the mineral decomposes, losing both $CO_2$ and water, to form an amorphous material. When formed at about 500° F., the amorphous material appears stable; however, when formed at about 700° F., and up to about 1100° F., the amorphous material breaks down, picking up moisture and recrystallizing to form soluble sodium carbonate hydrate ($Na_2CO_3 \cdot H_2O$) and insoluble bayerite ($Al(OH)_3$). Above about 1100° F. dawsonite loses all its $CO_2$ and water to become sodium aluminate. The intermediate amorphous phase provides a practical method for converting dawsonite to alumina, and, in general, the process of this invention comprises heating sodium aluminum carbonate hydroxide from about 500° or 700° to 1100° F. to produce a partial decomposition thereof, leaching the resulting amorphous material, e.g. with water, to remove the sodium component and leave a relatively pure aluminum hydroxide, and subsequently calcining the aluminum hydroxide, e.g. at 2100° F. to produce alumina having a low sodium content.

The temperature at which the sodium aluminum carbonate hydroxide such as dawsonite is calcined is generally at least about 500° F., preferably at least about 700° F. and in all cases the temperature and duration of calcination are sufficient to render the mineral amorphous in a form producing water-soluble sodium salts upon contact with air or water, e.g. sodium carbonate hydrate, and water-insoluble aluminum component such as aluminum hydroxide. The temperature does not exceed that at which significant amounts of sodium aluminate is formed, i.e. about 1100° F. Generally, calcination times of about ½ to 1 hour have been found suitable. The weight loss of sodium aluminum carbonate hydroxide due to CO₂ and water being driven off is apparently related to the formation of the desired amorphous material producing soluble sodium salts and insoluble aluminum hydroxide. To understand the weight losses due to CO₂ and water loss in terms of chemical composition, a series of hypothetical intermediate compounds between dawsonite ($Na_2O \cdot Al_2O_3 \cdot 2CO_2 \cdot 2H_2O$) and sodium aluminate $$(Na_2O \cdot Al_2O_3)$$

and the weight losses they represent, are set forth in Table I.

TABLE I

[Using the formula $Na_2O \cdot Al_2O_3 \cdot 2CO_2 \cdot 2H_2O$ and considering successive losses of $CO_2$ and $H_2O$]

| Decomposition product | | | Wt. percent loss from dawsonite |
|---|---|---|---|
| Name | CO₂ | H₂O | |
| Dawsonite | 2 | 2 | 0.0 |
| Intermediate A | 2 | 1 | 6.2 |
| Intermediate B | 2 | 0 | 12.5 |
| Intermediate C | 1 | 2 | 15.3 |
| Intermediate D | 1 | 1 | 21.5 |
| Intermediate E | 1 | 0 | 27.8 |
| Intermediate F | 0 | 2 | 30.5 |
| Intermediate G | 0 | 1 | 36.8 |
| Sod. Aluminate | 0 | 0 | 43.1 |

The production of an amorphous material upon calcination of dawsonite generally occurs with a weight loss of at least about 25%, which theoretically represents the loss of all water and about one half the carbon dioxide as an intermediate E (27.8% weight loss) and up to about 40%. Theoretically, dawsonite would experience a weight loss of about 43% upon conversion to sodium aluminate.

Leaching of the partially calcined dawsonite is preferably carried out with water at room temperature although any solvent selective for sodium, e.g., sodium carbonate, and not for aluminum hydroxide can be used, if desired. Also, if desired, the leach solution can be heated, e.g., at 100° F. or more, with the upper temperature controlled by that at which the aluminum component of the calcined dawsonite is dissolved by the solvent in any significant quantity. The aluminum hydroxide remaining after leaching is calcined to alumina under conventional conditions including a temperature of about 2100° F.

As mentioned above, oil shales found in the Green River shale formations are a source of dawsonite. The oil shales found in, for example, Rio Blanco County, Colorado, generally contain about 5 to 40 wt. percent, particularly about 10 to 30 wt. percent, kerogens, i.e., hydrocarbons which form recoverable oil, about 5 to 30 wt. percent, particularly about 10 to 20 wt. percent dawsonite, and about 10 to 40 wt. percent particularly 20 to 30 wt. percent quartz, or SiO₂ in some form. Nahcolite, which is present in pockets, and dolomite make up the essential remainder of the shale and may comprise about 10 to 40 wt. percent, particularly 20 to 30 wt. percent thereof. Dawsonite can also, if desired, be made from a solution of sodium aluminate and sodium carbonate having a high atomic ratio of sodium to aluminum of at least about 5:1, preferably at least about 20:1, by contacting the solution with carbon dioxide.

Dawsonite can be recovered in a relatively pure crystalline form from oil shales by leaching a retorted shale with an aqueous solution of sodium carbonate and sodium hydroxide under relatively mild conditions, i.e., a concentration sufficient to dissolve the aluminum component and temperatures of up to about 110° C., or more if one cares to use pressure equipment to maintain the liquid phase, and subsequently precipitating the dawsonite by treating the solution with carbon dioxide. The oil shale is generally retorted prior to recovery of the aluminum content. In this first or retorting step, the oil shales are generally crushed, e.g., to a particle size of about 1/10 to 100 mm. diameter, preheated and then the oil shale is transferred to a retorting zone where the particles are pyrolyzed to remove the kerogens as a fog or mist and vapors which are subsequently condensed to form an oil. The nahcolite may, if desired, be leached out prior to retorting, e.g., after crushing.

Retorting not only is desirable in this invention to recover the kerogens, but also to convert the shale to a form from which the aluminum is readily recoverable. Without retorting, the aluminum is difficult to recover from the oil shale since the kerogen makes the aluminum more or less inaccessible, whereas, upon retorting, the shale becomes porous and friable. Upon heating at a temperature of at least about 500° F., for example, crystalline dawsonite decomposes going to an amorphous state and, depending upon the temperature and other conditions, may be converted to other crystalline materials. For instance, if heated at about 900° F., cooled and then exposed to air, sodium carbonate and bayerite crystallize out of the amorphous dawsonite. At temperatures of about 1300° F. the dawsonite is converted to crystalline sodium aluminate. Additionally, retorting decomposes the dolomite in the shale to produce CO₂, calcite and MgO. The MgO ties up part of the SiO₂ in the shale to permit higher recovery of the aluminum values by leaching. Otherwise, this SiO₂ can, during retorting or leaching, react with the aluminum to form sodium aluminum silicate from which aluminum recovery is very difficult and uneconomical.

Retorting temperatures for the oil shale are generally from about 500 to 1500° F., or higher, e.g., up to about 1700° F. preferably about 800° to 1000° F., or even 1200° F. The upper temperature is usually that at which coking or undue cracking of the recovered oil vapors is a significant problem. Essentially all of the oil is recovered at temperatures in the range of from about 500 to 1200° F. With some oil shales, additional heating after retorting may improve aluminum recovery and in all cases retorting is carried out for a sufficient time to convert the dawsonite to a recoverable form. If additional heating is desirable, it may be conducted at temperatures of from about 1000 to 2400° F. for a time after removal of the kerogens sufficient to improve aluminum recovery, e.g., up to several hours, preferably about ten minutes to 2, 4 or even more hours. Whether or not recovery is increased by additional heating may depend upon the particular composition of the shale and each shale may be tested to determine this point. If desired, the retorted shale can be crushed after retorting, e.g., to a particular size of about 10 mm. or less, diameter.

The shale, after retorting, and additional heating if desired, is leached with a solution containing sodium carbonate and sodium hydroxide, under relatively mild conditions to dissolve the aluminum component and obtain a solution containing sodium aluminate, sodium carbonate and any excess sodium hydroxide. The leaching conditions include a basic pH sufficient to dissolve the aluminum component of the shale, preferably above about pH 11, and a temperature and time sufficient to dissolve the aluminum component but low enough to avoid dissolving much SiO₂, if present. The shale is advantageously leached while it is still warm from the retorting step. In general, leaching temperatures up to about 105 or 110° C., preferably about 40° to 100° C., particularly about 50° to 70° C., are suitable. The temperature should remain low enough to avoid substantial reaction with SiO₂, since with higher leaching temperatures more SiO₂ is dissolved by the alkali and the SiO₂ will re-precipitate as sodium aluminum silicate from which recovery of the aluminum is quite difficult. The lower temperatures are preferred since the equipment requirements, dangers to personnel, etc., are less.

Short leaching times are desirable to reduce the overall time of the process. Leaching times from about 5 to 10 minutes up to several hours, e.g., about 2 or more hours, preferably about 5 minutes to 1 hour, can be used, if desired, depending upon the temperature, volume and pH of the leach solution, and periods of about 15 to 30 minutes have been found to be particularly suitable.

The leach solution is used in a sufficient amount, e.g., above about twice the weight of the solid being treated, to given a fluid slurry so that the solution will thoroughly leach the retorted shale, and, in general, excess amounts of the leach solution are used so that the aluminum component will to a large degree be extracted with the leach solution thereby reducing the amount of washing necessary to obtain good aluminum recovery. Also, continuous countercurrent leaching of the shale can then be accomplished. However, since the leach extract contains fairly dilute amounts of aluminum further dilution with wash water is not too significant. The leach solution is typically a recycle solution and it is also desired in the treating slurry to have a high liquid to solids ratio. From about 5 to 25 or more parts by weight of leach solution per part of solids treated has been found to be a suitable amount in the slurry.

The leach solution generally contains a concentration of sodium hydroxide sufficient to extract the desired amount of aluminum, that is to solubilize the aluminum component in the retorted oil shale, which is at least a concentration sufficient to provide a sodium to aluminum atomic ratio of about 1:1 and this ratio does not usually exceed about 6:1 as larger amounts do not seem to improve aluminum recovery sufficient to justify the added cost. The actual concentration of sodium hydroxide will, therefore, depend upon several factors including the aluminum content of the shale, amount of recycle solution, temperature of leaching, etc. For instance, at 5 wt. percent available $Al_2O_3$ (11% dawsonite in the original shale) and at about a 12:1 weight ratio of solution to solids treated, a solution having about a 0.4 wt. percent concentration of sodium hydroxide gave a good recovery of the aluminum component in the shale. There will preferably be from about one to about three sodium ions per aluminum ion provided in the slurry from free sodium hydroxide, based on the aluminum recovered. Some of this sodium requirement can also come from the sodium aluminate in the retorted oil shale. The requirement that the sodium hydroxide must be subsequently neutralized in order to recover the aluminum component places, however, a practical upper limit on the concentration of sodium hydroxide. Generally, the concentration of sodium hydroxide in the solution will be from about 0.2 to 4 wt. percent, preferably about 0.3 to 1 wt. percent, based on the water and sodium hydroxide.

Sodium carbonate is present in the leach solution in amounts effective to provide sodium ions from the sodium carbonate and sodium hydroxide sufficient to precipitate the aluminum component in essentially crystalline form rather than as a gelatinous form. Crystals are desired for ease of recovery, e.g. by filtration. At the time of precipitation it is desired to have in the slurry a sodium to aluminum atomic ratio of at least about 5:1, preferably at least about 10:1, most advantageously at least about 20:1 and often not above about 60:1. The sodium carbonate is present in the leach solution in an amount of at least about 1.5 moles per mole of sodium hydroxide. Preferably this ratio is at least about 4:1, or even at least about 8:1. The sodium is employed both as the hydroxide and as the carbonate, however, for reasons discussed above, it is desired to keep the amount of sodium supplied as free sodium hydroxide at a minimum because of its expense and also to reduce the carbon dioxide requirements. In addition to sodium hydroxide and sodium carbonate some sodium may be supplied as sodium chloride, coming either from leaching of the oil shale or from brine used in making the leach solutions. Insofar as an upper amount of sodium is concerned, the leach solution can be saturated with sodium carbonate although both the most efficient amounts of sodium carbonate and sodium hydroxide required can be easily determined and are dependent upon such variables as temperature of leaching, amount of recycle solution and aluminum and sodium contents of the shale.

Following leaching, the leach solution which now contains dissolved aluminum, e.g. sodium aluminate, is filtered to separate undissolved solids, e.g. dolomite quartz, calcite, etc., and then treated to neutralize the hydroxide, e.g. with carbon dioxide, and precipitate the aluminum component. Carbon dioxide is generally used in an amount sufficient to precipitate the dissolved aluminum component as sodium aluminum carbonate hydroxide or dawsonite. The use of excess carbon dioxide has no adverse effect on the precipitation but is of little, if any, value since it merely bubbles out and a portion may have to be removed from the leach solution before it can be recycled. The leach solution may be heated during the carbon dioxide treatment, preferably to between about 60° and 100° C., since this tends to improve the crystallinity of the precipitate. The aluminum component precipitate can be separated from the mother liquor, e.g. by filtration and washed. The carbonated mother liquor remaining after separation of the aluminum precipitate can be adjusted to proper concentration of sodium carbonate by adding or removing water or sodium carbonate, and then adjusted to the proper concentration of sodium hydroxide by treating with lime ($Ca(OH)_2$) including unslaked lime (CaO) to precipitate out some of the carbonate ions as $CaCO_3$, or by adding sodium hydroxide. The treated solution can then be recycled to the leaching step for treatment of additional retorted oil shale.

The following example serves to illustrate the recovery of dawsonite from an oil shale.

Example I

An oil shale from the center of the Piceance Basin, Rio Blanco County, Colorado, taken over the depth interval 1969′ to 2438′ was crushed to a ⅛ to ¼ inch size. In addition to about 21 gallons of oil per ton, this shale contains about 11% dawsonite [$NaAlCO_3(OH)_2$] with the remainder being primarily quartz ($SiO_2$) and dolomite [$CaMg(CO_3)_2$]. A sample of the shale was placed in an oil shale assay retort operated so the pyrolysis of the shale is carried out in the effective absence of oxygen for 2 hours at 1200° F. to drive off the oil, water and $CO_2$. The retorted oil shale was a black, porous, friable substance. This retorted oil shale was crushed to an approximate size to pass a 100 mesh sieve.

A portion of the crushed retorted shale was then treated by a leaching operation. In the leaching operation, 50 g. retorted oil shale were added to the leach solution in a stainless steel beaker at 60° C. and stirred for 15 minutes. The suspension was then freed of solids by pumping it through a vacuum filter funnel (Buchner type). The retained oil shale, free of leach solution, was then washed with 50 cc. of water. The leach solution and the wash water were combined and heated to 95° C. in a stainless steel beaker. While stirring and holding at 95° C., the beaker (loosely covered) was flooded with gaseous $CO_2$. The $CO_2$ was absorbed, gradually converting the solution from the alkaline side to the bicarbonate side. At the time this conversion occurs a cloudy precipitate of dawsonite forms. The heating, stirring and flooding with $CO_2$ continued for 45 minutes after this conversion.

The suspension of dawsonite in the sodium carbonate-bicarbonate solution was then cooled somewhat and transferred to a Buchner funnel. The dawsonite was freed of mother liquor, washed a few times with water, dried and weighed. As the hot mother liquor cools additional dawsonite precipitates. This additional precipitate was also recovered, except in run No. 1. Some loss of yield is caused by retention of dawsonite on the filter paper. The leaching solution and results are set forth in Table II.

TABLE II

| Run No. | 1 | 2 | 3 | 4 | 5 |
|---|---|---|---|---|---|
| Retorted oil shale (g.) | 50 | 50 | 50 | 50 | 50 |
| Leaching solutions: | | | | | |
| Water (ml.) | 500 | 500 | 500 | | 500 |
| $Na_2CO_3$ (g.) | 106 | 106 | 106 | | 84.5 |
| NaCl (g.) | 0 | 0 | 0 | 0 | 25 |
| NaOH (g.) | 2 | 4 | 10 | 4 | 4 |
| Na/Al atomic ratio | 41 | 42 | 45 | | |
| Yield of dawsonite (g.) | 3.35 | 5.25 | 5.89 | 4.3 | [2] 5.04 |
| Percent of original dawsonite [1] | 47 | 74 | 83 | 61 | 71 |

[1] Assuming the original dawsonite in the oil shale corresponds to 7.0 g. per 50 gr. of retorted oil shale.
[2] Only a trace (−1 p.p.m.) of chloride was found in this product.

The solution used in run 1 to treat the retorted oil shale, which would be expected to give 2.47 g. $Al_2O_3$ based upon prior assay, included 2.0 g. NaOH, enough to react with and to solubilize (as $NaAlO_2$) 2.55 g. $Al_2O_3$. The 106 g. $Na_2CO_3$ provides a ratio of total Na ions to Al ions of 41:1, if the above-cited 2.55 g. $Al_2O_3$ is solubilized. This high Na:Al ratio and the corresponding high $CO_3$ to Al ratio produces well-crystallized dawsonite in preference to aluminum hydroxide gel. The NaOH content was increased for runs 2 and 3, the latter having sufficient NaOH to give an approximately 5:1 Na to Al atomic ratio.

In run 4, the mother liquors from which dawsonite was precipitated in runs 2 and 3 were combined and reused, after adjusting the sodium carbonate concentration to match the density of the standard leaching solution, i.e. 106 g. $Na_2CO_3$ in 500 cc. water. Then 4 g. NaOH was added. This run demonstrates that the leach solution can be recycled after removing its aluminum content as dawsonite and treatment to give the desired NaOH and $Na_2CO_3$ contents.

Run 5 utilizes 5% brine in place of water to formulate the leaching solution since fresh water is scarce in many areas where oil shale is found. In run 5 the sodium carbonate in the solution was reduced to 84.5 g. This adjustment maintained the sodium ion concentration at the same level, but dropped the carbonate ion concentration. 4 g. NaOH was used.

The following example illustrates the production of sodium aluminum carbonate hydroxide from sodium aluminate and sodium carbonate.

Example II

Sodium aluminate and sodium carbonate were stirred in aqueous solution and heated to 95° C. At this time, the surface of the solution in the vessel was flooded with $CO_2$ at 1 atm. until precipitation occurred, over 45 minutes. The make-up of the solution including amounts of sodium aluminate and sodium carbonate for several runs made are set forth in Table III.

TABLE III

| Run | $Na_2CO_3$ (g.) | $NaAlO_2$ (g.) | $H_2O$ (cc.) | Ratio Na/Al | Dawsonite X-ray diffraction |
|---|---|---|---|---|---|
| A | 106 | 4.10 | 500 | 41.0 | Very well crystallized. |
| B | 53 | 4.10 | 500 | 21.0 | Well crystallized. |
| C | 26 | 4.10 | 500 | 11.0 | Moderately crystallized. |
| D | 0 | 4.10 | 500 | 1.0 | Boehmite and Bayerite. |
| E | 106 | 136 | 500 | 2.6 | Boehmite and small amount of dawsonite poorly crystallized. |

The results set forth in Table III illustrate the effect of the sodium to aluminum atomic ratio in the solution upon the precipitated product. As demonstrated by run C, a Na/Al ratio of 11 produces a moderately well defined crystalline dawsonite whereas with the lower Na/Al ratios of runs D and E, boehmite and bayerite are produced. The preference for the higher Na/Al ratios is clearly demonstrated by runs A and B.

Example III

Dawsonite in 0.5 gm. samples, as produced in Example II, was calcined at a series of temperatures for ½ hour. The weight losses were then determined, and X-ray diffraction patterns were run on the product of the calcination. Resules of the calcination of the material are set forth in Table IV. The response of the calcination products to submersion in water is also shown in Table IV.

TABLE IV

| Temperature (° F.) | Wt. percent loss | Product X-ray diffraction | Reaction with water |
|---|---|---|---|
| 200 | 0.0(1.36) | Dawsonite | Insoluble. |
| 400 | 2.5 | do | Do. |
| 600 | 27.9 | Amorphous | Part soluble residue amorphous. |
| 800 | 33.1 | do | Part soluble residue Al(OH)₃ |
| 1,000 | 36.3 | do | Do. |
| 1,200 | 40.7 | Sod. aluminate | Soluble. |
| 1,400 | 42.2 | do | Do. |
| 1,600 | 43.3 | do | Do. |
| 1,800 | 43.7 | do | Do. |

Calcination at 200° F. and 400° F. had little effect on the dawsonite. The meaning of the slight weight losses is not known although the weight loss at 200° F. (1.36%) is attributed to loss of adsorbed water. The 1.36% weight loss at 200° F. is made the basis, i.e. zero, for all other weight loss data. The 2.5% additional loss suffered at 400° F. represents nearly one-half conversion to the intermediate A ($2CO_2,1H_2O$). X-ray diffraction patterns, however, show the 200° and 400° products to be pure dawsonite.

Calcination at 600° F. causes a 27.9% weight loss corresponding to the loss of all the water and half of the $CO_2$ as in intermediate E which theoretically has a 27.8% loss. Thus, several of the intermediates considered appear to have been skipped. X-ray diffraction indicates that intermediate E is amorphous. Calcination at 800° and 1000° F. also produces an amorphous phase, the weight losses of 33.1% and 36.3% suggest that less than 1 $CO_2$ is associated with the $Na_2O \cdot Al_2O_3$ formula, see intermediate E.

The calcination at 1200° F. and higher produces sodium aluminate, as indicated both by weight loss and X-ray diffraction pattern. The X-ray diffraction patterns show some improved crystallinity at the higher temperature.

The response of these calcined samples to immersion in water varies from insoluble to partly soluble and corresponds to the loss of $CO_2$ and consequent increase in alkalinity of the material. The 600° F. amorphous product gave the least interaction with water and the residue was amorphous, containing 1.3% sodium. The 800° F. and 1000° F. amorphous products appeared to give up all of their sodium as the product is the crystalline $Al(OH)_3$ known as bayerite. The bayerite settles in about 15 minutes and is not a gelatinous form. The two bayerite samples contained 0.8 and 1.3% sodium, respectively.

It is claimed:

1. A process for the preparation of aluminum hydroxide from sodium aluminum carbonate hydroxide comprising calcining sodium aluminum carbonate hydroxide at a temperature of about 500 to 1100° F. and for a time insufficient to convert it to sodium aluminate and leaching the calcined material with water to remove resulting soluble sodium components and leave aluminum hydroxide.

2. The process of claim 1 wherein said temperature is from about 700° to 1100° F.

3. The process of claim 2 wherein the sodium aluminum carbonate hydroxide experiences a weight loss of about 25% to 40% during calcination.

4. A process for the preparation of alumina of small sodium content from sodium aluminum carbonate hydroxide comprising calcining sodium aluminum carbonate hydroxide at a temperature of about 500 to 1100° F. and for a time sufficient to render it amorphous and insufficient to convert it to sodium aluminate, leaching the calcined material with water to remove resulting soluble sodium components and leave aluminum hydroxide, and calcining the resulting aluminum hydroxide to alumina.

5. The process of claim 2 wherein said temperature is from about 700° to 1100° F.

6. The process of claim 5 wherein the sodium aluminum carbonate hydroxide experiences a weight loss of about 25% to 40% during calcination.

7. The process of claim 4 wherein the sodium aluminum carbonate hydroxide is heated for a time sufficient to evolve essentially all the water and about one half the carbon dioxide therefrom.

References Cited

UNITED STATES PATENTS 3,389,975  6/1968  Van Nordstrand.

OSCAR R. VERTIZ, Primary Examiner

G. T. OZAKI, Assistant Examiner

U.S. Cl. X.R.

23—52, 315

FO-1050
(5/69)

UNITED STATES PATENT OFFICE
CERTIFICATE OF CORRECTION

Patent No. 3,459,502  Dated August 5, 1969

Inventor(s) Robert A. Van Nordstrand

It is certified that error appears in the above-identified patent and that said Letters Patent are hereby corrected as shown below:

Claim 5, Line 1, delete "claim 2" and insert therefor --claim 4--.

Claim 7, Line 1, delete "claim 4", and insert therefor --claim 5--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents